Sept. 27, 1949.  G. HERZOG  2,483,139
METHOD AND APPARATUS FOR LOGGING BORE HOLES
Filed Dec. 31, 1943
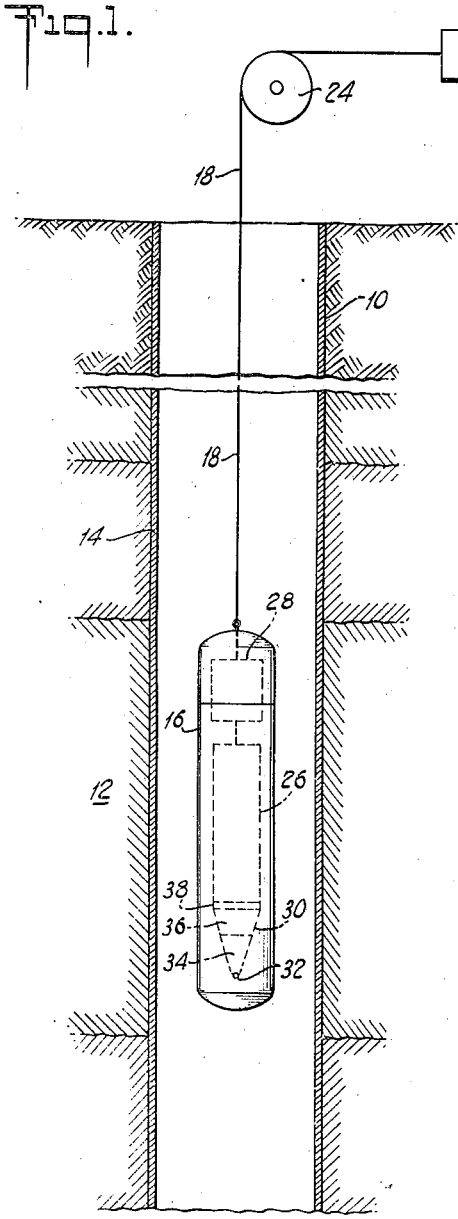
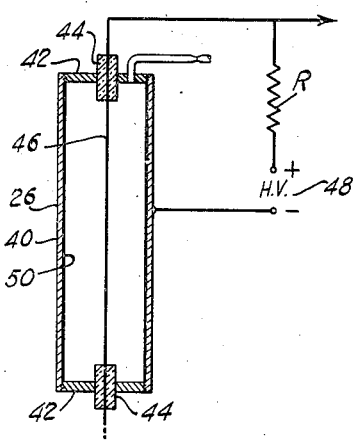
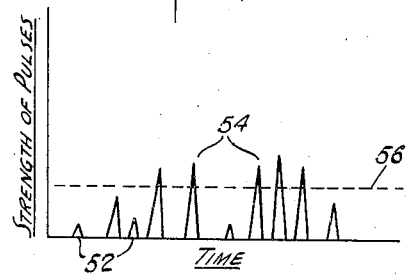
INVENTOR
GERHARD HERZOG.
BY R. J. Dearborn
ATTORNEY Patented Sept. 27, 1949

2,483,139

UNITED STATES PATENT OFFICE 2,483,139

METHOD AND APPARATUS FOR LOGGING BOREHOLES

Gerhard Herzog, Houston, Tex., assignor to The Texas Company, New York, N. Y., a corporation of Delaware Application December 31, 1943, Serial No. 516,398

2 Claims. (Cl. 250—83.6)

This invention relates to bore hole or well logging and more particularly to a method and an apparatus for determining the nature and location of underground formations traversed by a bore hole, by subjecting these formations to penetrating radiation and measuring the amount of the radiation which is scattered and slowed down in the formations and returned to the bore hole.

During the past year or so bore holes have been logged by passing a source of neutron radiation through the hole together with a radiation detector. Neutrons which penetrate the formation interact with the nuclei in the rock and two processes occur. In one case the neutrons are captured by nuclei in the formation and gamma rays are emitted either simultaneously or subsequently. In a second case the neutrons are scattered by the nuclei in the formations whereby both their direction and their energy is changed. In some cases, together with the scattering of neutrons, gamma rays are released. The intensity of either the gamma rays or the scattered neutrons can be taken as a measurement of the physical properties of the formations and one can therefore obtain a log of the formations by either measuring the intensity of the gamma rays or of the scattered neutrons.

During the past year or so logs have been taken in which it was attempted to measure the intensity of these gamma rays. In carrying out that method a source of neutron radiation such as a mixture of radium and beryllium has been mounted in a housing and a detector of gamma rays has been disposed within the housing, usually above the neutron source and separated from the source by a fairly heavy shield in order to minimize the effect of neutrons and gamma rays which pass directly from the source to the detector. This method has the following disadvantages: the neutron source generally used, which consists of a mixture of radium and beryllium, emits together with the neutrons a large intensity of gamma rays. These primary gamma rays penetrate into the formation and are scattered, whereby some of the primary gamma rays enter the detector. In addition to these gamma rays, other gamma rays are impinging on the detector, these being due to natural radioactive material in the formation. It is the object of the "neutron to gamma ray" log to measure only those gamma rays which are due to the interaction of the neutrons and nuclei in the formation. This can only be done if the gamma ray intensity due to this process is quite large compared to the gamma ray intensity which is caused both by scattering of the primary gamma rays and those naturally present in the formation. In attempting to obtain a favorable ratio it is customary to separate the neutron source by a large distance from the detector, whereby the scattering effect is decreased, but unfortunately the intensity at the detector of the gamma rays due to the neutron effect is also decreased.

The effect of scattered gamma rays can obviously be avoided if a neutron source is used which emits only neutrons and not gamma rays, for example a mixture of polonium and beryllium. Such a source is not only very expensive but it is so rare as to be almost unobtainable. Even with the use of such a source one would still have to secure enough contrast between the gamma rays which are due to the natural ratioactivity of the ground and the gamma rays which are created from the neutron interaction. In order to make this ratio favorable, one has to use a very large neutron source.

All these factors can be avoided if a neutron log of a different type is used. In this case again a neutron source which may or may not emit gamma rays is lowered into the hole together with a detector, but the detector is such that it measures the number of the scattered neutrons to the substantial exclusion of gamma radiation. In dealing with neutrons one has to discriminate between "fast" and "slow" neutrons. Slow neutrons are neutrons of small velocity and their energy is of the order of the thermal energy. Fast neutrons are of much higher energy. A radium-beryllium mixture emits a greater part of the neutrons as fast neutrons.

As devices for detecting radiation generally, ionization chambers, proportional counters or Geiger-Muller counters can be used.

The actions of an ionization chamber, a proportional counter, and a Geiger-Muller counter differ as follows: in all three cases ions are set free in a gas in the detector through the action of the rays. This ionizing may be a direct ionization of the gas or it may be a secondary ionization of the gas due to the action of charged particles which are emitted from the walls of the container. In all three devices the ions are collected at the electrodes, but in the Geiger-Muller counter and in the proportional counter a multiplication of the ions occurs within the detector. Due to this multiplication, the charge which is collected is much larger in the cases of the Geiger-Muller counter and of the proportional counter than in the ionization chamber. The charge collected may or may not be dependent on the number of primary ions which are formed in the gas by one individual ray. In a Geiger-Muller counter this multiplication results in a charge the size of which is independent of the number of ions formed by one ray; in a proportional counter, however, the charge is proportional to the number of ions formed. The result is, therefore, that the size of the charge pulses in a proportional counter varies with the effectiveness or strength of the ionizing rays. The number of these pulses is a meaure of the number of such rays, i. e., of the intensity of the rays. It is therefore possible with a proportional counter to distinguish between rays which produce different amounts of primary ionization.

Neutrons, themselves, do not ionize at all. Therefore, in order to detect neutrons one has to use an intermediate reaction by which the neutrons release an ionizing particle which in turn acts on the gas filling of the proportional counter. Such reactions are known to occur with, for example, lithium and boron. A proportional counter can either be filled with a neutron-reactive gas, such as boron trifluoride, which contains a compound of one of these elements, or the wall of the counter can be lined with neutron-reactive elements or their compounds, or both the reactive wall coating and the reactive gas can be used. In these reactions alpha particles are emitted under the action of the neutrons, whereas gamma rays release electrons. The specific ionization of alpha rays is much greater than that of electrons; therefore, the charge pulses in the proportional counter are larger if they are due to neutrons than if due to gamma rays. By selecting the pulse size with suitable electrical circuits one can therefore distinguish between neutrons and gamma rays.

In accordance with this invention a source of neutrons, preferably a mixture of radium and beryllium, together with a radiation detector, is mounted in a housing which is adapted to be passed through the bore hole. The fast neutrons emitted by the source pass outwardly into the formations traversed by the hole, and in these formations the neutrons are scattered and slowed down, some of them returning to the detector. Gamma rays may or may not be released by collision of the neutrons with nuclei in the formations.

The invention contemplates the use of a proportional counter or counters as the means for detecting the returned, slow neutrons, and, since, as has been explained, such a device is sensitive primarily to slow neutrons and relatively insensitive to fast neutrons and gamma rays, a highly effective detector is thereby provided. The presence of a casing in the bore hole has no detrimental effect on the efficacy of the invention.

For a better understanding of the invention reference may be had to the accompanying drawing in which:

Fig. 1 is a vertical elevation showing somewhat diagrammatically the strata surrounding a portion of a bore hole or well;

Fig. 2 is a vertical section showing diagrammatically a radiation detector of the proportional counter type; and Fig. 3 is a curve illustrating the variation in both size and frequency of the pulses of a radiation detector.

Referring to the drawing, a bore hole 10 is shown as penetrating several underground formations or substrata one of which is indicated at 12, the hole being provided with a casing 14. A logging instrument represented generally by a housing 16 in the form of an elongated capsule is adapted to be lowered and raised through the hole by means of a suspending cable 18, this cable containing one or more electrical conductors which serve to conduct the output of the instrument to a linear amplifier 20 at the surface, connected in turn to a suitable recorder 22. The cable 18 may also conduct to the instrument in the hole the electric current necessary to energize the elements of which the instrument 16 is comprised. The cable 18 is shown as passing over a pulley or drum 24 which serves to measure the length of the cable and thus the depth of the instrument in the hole as is well known in this art.

Mounted within the housing 16 is a detecting device 26 of the proportional counter type, the output of which may be lead to the cable 18, if desired, through a suitable linear preamplifier 28 as is indicated in dotted lines. A member 30, which may be cone shaped as shown in the drawing, depends from the lower end of the detector 26, and at the apex of the member 30 is a source of penetrative radiation which may be a small capsule 32 containing a mixture of radium and beryllium, capable of emitting neutrons. The member 30 may be formed as a hollow cone of any desired material such as brass, into the lower or smaller end of which is placed a quantity of material such as lead 34, the purpose of which is to absorb gamma radiation released by the source 32 and which might otherwise pass directly to the detector 26. In the upper or wider end of the member 30 a quantity of a material such as paraffin 36 is placed, the purpose of which is to slow down neutrons passing from the source 32 upwardly toward the detector 26. Between the upper or wider end of member 30 and the lower end of the detector 26 is a layer of a material such as cadmium 38 capable of absorbing neutrons which have been slowed down in the paraffin 36 so that they will not reach the detector.

In Fig. 2 is shown somewhat diagrammatically a cross-section through a detector of the proportional counter type which it is preferred to use in connection with the method of this invention, the detector shown generally at 26 comprising a fairly thin cylinder 40 which may be of brass, this cylinder being provided with upper and lower end closure members 42 preferably provided with circumferential threads so that they may be screwed tightly into the ends of cylinder 40. These end members may be formed of the same material as the cylinder. Each of the members 42 is provided with a center opening into which an electrical insulator, preferably of glass and of tubular form, is tightly fitted. The cylinder 40 forms the cathode of the counter and a fine wire 46 stretched between the insulators 44 forms the anode of the counter. The anode is maintained at a positive potential with respect to the cathode 40, and a very high resistance R of the order of one megohm is connected in series with the electrode and a source of high potential 48. It has been found that for a proportional counter constructed as is described a potential difference of the order of 1000 volts is satisfactory.

In a proportional counter for detecting slow neutrons, it is essential that the walls of the cathode 40 be prepared by placing on the walls a coating 50 of a neutron-reactive material such as a compound of boron, for example boron carbide. It has been found that a boron carbide coating about three mils in thickness is satisfactory. In the absence of such a coating it is essential that a suitable neutron-reactive gas such as boron trifluoride be maintained within the counter. In the counter in which the neutron-reactive coating is present, a suitable ionizable gas filling under low pressure will be used, and it has been found that a gas such as methane under a pressure of about two inches of mercury is satisfactory as an ionizable medium. In another type of proportional counter in which a neutron-reactive gas such as boron trifluoride is used the pressure of this gas will also be low and of the order of two inches of mercury. It is understood that in the detector 26 one or the other of these practices is followed, or both simultaneously; i.e., the the interior surface of the cathode 40 be coated with a neutron-reactive material such as boron carbide or that the space within the counter be filled with a neutron-reactive gas such as boron trifluoride.

In operation, the housing 16 is passed through the hole 10 by means of the cable 18 and the depth of the instrument is noted simultaneously with the indication of the meter or recorder 22. Fast neutrons from the source 32 penetrate the formations such as 12 wherein some, depending upon the character of the formations, are slowed down by collision with the nuclei of the material of the formations, and some of these are scattered back to the hole where they may intercept the detector 26. A slow neutron passing into the counter strikes the coating 50 and an alpha particle may be released into the interior of the counter causing ionization of the gas filling, and thus a discharge or currrent pulse passes to the preamplifier 28 and through the cable to the amplifier 20 to be recored by the instrument 22.

Gamma rays which may be released due to the natural radioactivity of the formation, gamma rays released from the source 32 and scattered in the formation and returned to the counter, as well as gamma rays released by the reaction of a neutron penetrating the formation and also direct gamma rays from the source may also strike the detector and, by causing electrons to be ejected, produce ionization and thereby discharges or pulses within the detector. The discharges or pulses caused by gamma ray ionization are generally smaller than the discharges caused by neutrons. In Figure 3 the strength of the counter discharges or pulses is shown as plotted against time and the discharges due to gamma ray ionization are indicated at 52, whereas the discharges due to neutrons striking the counter are indicated at 54. It will be noted that the size of many of the discharges caused by neutrons is considerably greater than the size of the discharges caused by gamma rays, and by means of the linear amplifiers 28 and 20 a selective determination of the discharges can be made. In other words, only those discharges or pulses having a size greater than is shown, for instance, by the dotted line 56 will be recorded by the instrument 22. In this manner the intercepted radiation of a predetermined type, i. e., neutrons, can be measured to the exclusion of gamma radiation.

In some cases it may be desired to measure fast neutrons returning from the surrounding formation to the instrument in the hole and for this purpose a proportional counter may be used in which the gas filling is hydrogen at a low pressure. Again, a coating similar to the coating 50 but of a substance containing hydrogen, such as paraffin, can be used, together with a gas such as methane under low pressure.

Although a single proportional counter has been described as the detector 26, it is contemplated that a plurality of proportional counters can also be used as is described in the copending patent application of myself and K. C. Crumrine, Serial No. 511,990, filed November 27, 1943, now Patent No. 2,443,731.

Obviously many modifications and variations of the invention, as hereinbefore set forth, may be made without departing from the spirit and scope thereof, but only such limitations should be imposed as are indicated in the appended claims.

I claim:

1. The method of logging a bore hole to determine the character and location of formations traversed by the hole which comprises passing through the hole a source of radiation from which neutrons and gamma rays are emitted, some of the neutrons being scattered and slowed down in the formations and returned to the hole along with natural gamma rays from the formations, gamma rays induced in the formations by neutron bombardment and gamma rays originating in the source and scattered in the formations, the number of the returned, slowed neutrons depending upon the character of the formations, impressing an electrical potential of the order of 1,000 volts on an ionizable medium of relatively low density and exposing said ionizable medium to secondary radiation produced by the neutrons intercepting said drill hole as well as to said gamma rays intercepting the drill hole whereby electrical discharges are created in said ionizable medium, the size of the discharges depending upon the nature of the radiation intercepted and the number of the discharges being determined by the intensity of the intercepted radiation, and measuring only those discharges whose magnitude is sufficiently great to be indicative of the fact that they are created by slow neutrons.

2. An apparatus for logging a bore hole comprising a housing, a cable for suspending said housing so that it can be passed through the bore hole, a source of neutrons in said housing, from which fast neutrons bombard the formations around the hole, some of the neutrons being scattered and slowed down by collision with the nuclei of the formations and returned to the hole, a radiation detector in said housing, a shield between said source and said detector to absorb gamma rays and neutrons tending to pass directly from the source to the detector, said detector comprising a closed metal container forming a cathode, a wire forming an anode disposed longitudinally through and insulated from said container, an electrical potential of the order of 1,000 volts connected across said cathode and said anode, an ionizable gas filling within said container under relatively low pressure and a coating on the inner surface of said container, said coating being of a substance capable of releasing alpha particles when struck by slow neutrons, said alpha particles and the gamma rays intercepting the detector causing ionization of said gas to produce electrical discharges of different sizes, and circuit means connected to the detector for selectively amplifying and recording those discharges whose magnitude is sufficiently great to be indicative of the fact that they are created by slow neutrons.

GERHARD HERZOG.

(References on following page)

REFERENCES CITED

The following references are of record in the file of this patent:

UNITED STATES PATENTS

| Number | Name | Date |
|---|---|---|
| 2,220,509 | Brons | Nov. 5, 1940 |
| 2,288,718 | Kallmann | July 7, 1942 |
| 2,303,709 | Siegert | Dec. 1, 1942 |
| 2,334,262 | Hare | Nov. 16, 1943 |
| 2,345,119 | Hare | Mar. 28, 1944 |
| 2,351,028 | Fearon | June 13, 1944 |

OTHER REFERENCES

Korff and Danforth, Physical Review, vol. 55, May 15, 1939, p. 980 (Scientific Library).

"Procedures in Experimental Physics" by Strong (1942), published by Prentice Hall, New York, pp. 259-262.